(12) United States Patent
Kelder et al.

(10) Patent No.: US 6,280,484 B1
(45) Date of Patent: *Aug. 28, 2001

(54) METHOD FOR THE MANUFACTURE OF A LITHIUM BATTERY

(75) Inventors: Erik M Kelder, Nootdorp; Michiel J. Jak, Nienwerkerk Aan den Lissel; Johannes Schooman, Wassenaak, all of (NL)

(73) Assignees: Stichting voor de Technische Wetenschappen, Utrecht; Stichting Scheikundig Onderzoek Nederland, Den Haag, both of (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,891

(22) PCT Filed: Sep. 11, 1996

(86) PCT No.: PCT/NL96/00356

§ 371 Date: Sep. 10, 1998

§ 102(e) Date: Sep. 10, 1998

(87) PCT Pub. No.: WO97/10620

PCT Pub. Date: Mar. 20, 1997

(30) Foreign Application Priority Data

Sep. 11, 1995 (NL) .................................................... 1001168
Feb. 13, 1996 (NL) .................................................... 1002318

(51) Int. Cl.⁷ ................................................ H01M 10/36
(52) U.S. Cl. ..................................... 29/623.3; 29/623.1
(58) Field of Search ................................ 29/623.1, 623.3

(56) References Cited

U.S. PATENT DOCUMENTS 4,782,584 * 11/1988 Mohri et al. ...................... 29/623.1
5,262,255   11/1993 Ito et al. .

FOREIGN PATENT DOCUMENTS

| 41 08 805 | 9/1991 | (DE) . |
| 0 409 192 | 1/1991 | (EP) . |
| WO84/02232 | 6/1984 | (WO) . |

OTHER PUBLICATIONS

Delft Integraal, Issue 3, 1995 (in Dutch by the Technical universty of Delft, Delft, Netherlands).

* cited by examiner

Primary Examiner—John S. Maples
(74) Attorney, Agent, or Firm—Jeffrey D. Myers

(57) ABSTRACT

The invention relates to a method for the economic manufacture of lithium batteries by means of dynamic compaction. To this end cathode, electrolyte and/or anode material is taken up in a carrier. The carrier, according to a preferred embodiment, is a plastic. This facilitates the handling of the material, while in addition thin layers can be made. According to a preferred embodiment the plastic material is a lithium ion-conductive plastic.

11 Claims, 1 Drawing Sheet

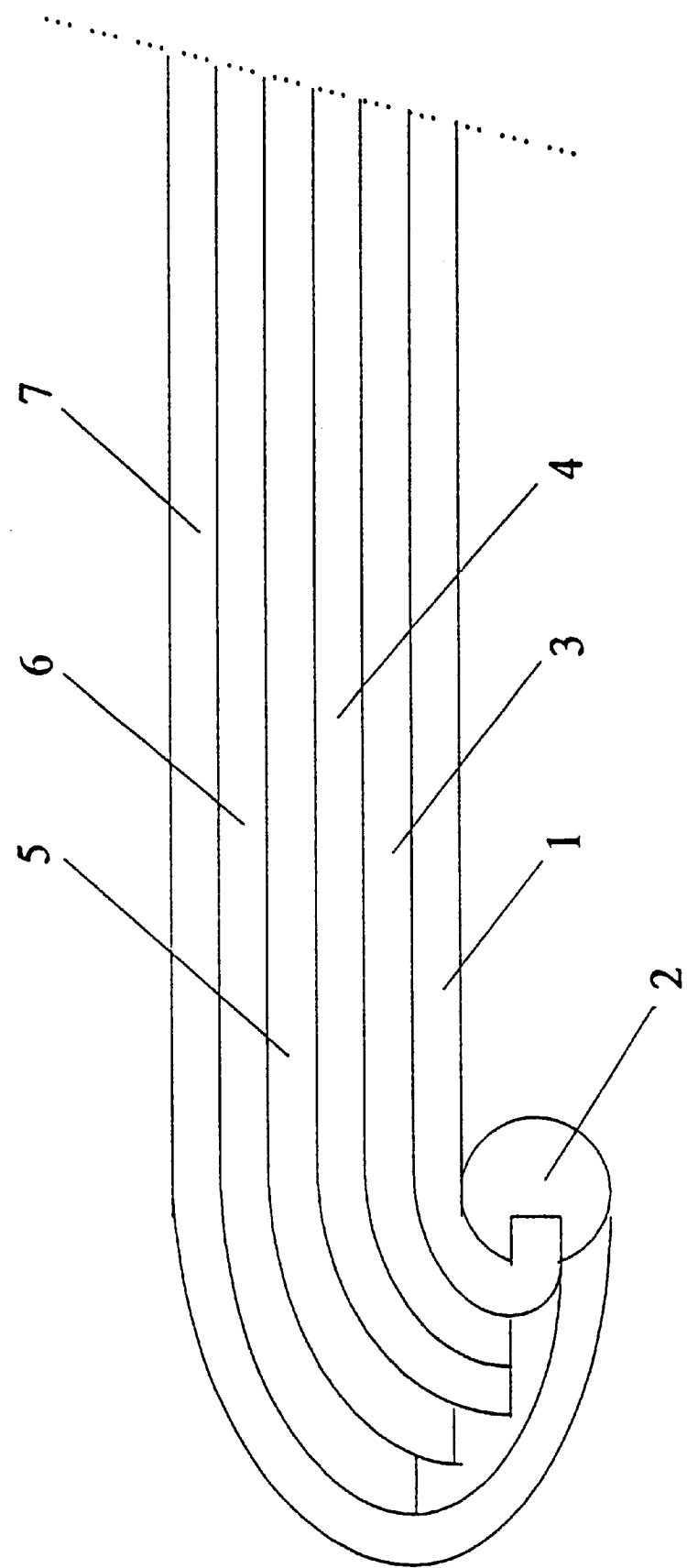

METHOD FOR THE MANUFACTURE OF A LITHIUM BATTERY

The present invention relates to a method for the manufacture of a lithium battery comprising the steps of
the contacting cathode material, electrolyte material and anode material, the electrolyte material being a lithium ion-conductive and a for electronic charge carriers (electrons and holes) non-conductive material and separating the cathode material from the anode material, wherein at least the cathode material is a ceramic material and at least either the cathode material or the anode material or both contain lithium,
dynamic compaction of the assembly of cathode material, electrolyte material and anode material.

In this application "battery" is understood to be a stack of one or more cells, wherein just one current collector between the cells suffices. A "cell" is understood to be a stack of, successively, a current collector, an anode, an electrolyte, a cathode and a current collector.

A method as mentioned ill the preamble is known.

In said method an aluminium tube, provided with an insulating inner tube of Teflon is filled with layers of, successively, lithium manganese oxide as the cathode material, lithium oxide-containing boron phosphate as the electrolyte material and graphite as the anode material. Each of the materials is introduced into the tube in the form of a powder of a small particle size (in the order of 1 $\mu$m), is precompacted by tapping a great number of times (in the order of 200 times) and is subsequently subjected to further compaction by means of a hydraulic device before the next material is inserted. After the tube is sealed with a stop the tube is explosion compacted by providing the tube at one end and over its length with an explosive that on detonation produces a pressure build-up, and detonating the same. This causes an extremely high pressure, compacting the materials and enlarging the contact surface between the granules and between the layers.

The method has the disadvantage of being time-consuming and laborious. In addition it is difficult to make thin layers while the risk of short-circuiting between the anode material and the cathode material increases.

The object of the present invention is to overcome these disadvantages and to provide an economically attractive method for the manufacture of dynamically compacted lithium batteries.

To this end the method according to the invention is characterized in that at least one of the materials is introduced into a carrier in the form of a fine powder before being brought into contact with any of the other materials.

Introduction into a carrier facilitates the handling of the powdery material. The carrier may be a liquid carrier or a solid carrier.

According to a preferred embodiment of the method according to the invention, the carrier containing the finely distributed material is processed to form a solid film before introduction into the tube.

Such a film can be handled and can easily be stacked.

According to a favourable embodiment, in the process to form a solid film a plastic is used as the carrier.

The incorporation of fillers in plastics is a widely known technique and may advantageously be used for the fast and simple manufacture of stacked layers of cathode, electrolyte and anode material.

According to a very favourable embodiment the plastic is a lithium ion-conductive plastic.

As the performances of a lithium battery are limited primarily by the degree of electrical conductance of lithium ions in the battery, the invention makes it possible to appreciably improve the cathode layer, the electrolyte layer and/or the anode layer, and as a result the lithium battery.

The invention will now be described in more detail and will be further explained with reference to an example.

BRIEF DESCRIPTION OF THE (FIGURE)

The FIGURE shows a method of manufacturing a battery by means of winding.

Lithium batteries, and in particular rechargeable lithium batteries, are well-known in the field. As cathode material they may, for instance, contain pure or doped lithium nickel oxide, lithium cobalt oxide and preferably lithium manganese oxide. Known anode materials are, among others, metallic lithium, carbon in all its chemical forms, particularly turbostratic graphite or carbon modified with, for instance, boron, fluor or boron nitride, in which lithium is incorporated atomically or in metallic form. The cathode material and the anode material are separated by electrolyte material. This electrolyte material must be permeable for lithium ions but not for lithium atoms and must not be an electron-conductive. In the known lithium batteries polymers such as Nafion, etc. are used as electrolyte material (see Koksbang, R. et al.; Review of hybrid polymer electrolytes and rechargeable lithium batteries. Solid state Ionics 69, pp. 320–335, 1994). More materials for anode, cathode and is electrolyte, which are often ceramic materials, are described in Julien, C. et al. (ed., Solid state batteries: materials design and optimization, Kluwer Academic Publications, 1994) and in Pistoia, G. (ed., Lithium batteries; Industrial Chemistry Library, Vol. 5, Elsevier, 1994). As electrolyte material, electrolyte material based on sulphide may be used to advantage, an described by Bruce, P. G. (ed., solid State Electrochemistry, Cambridge University Press, 1995).

A cell comprises a cathode, an electrolyte and an anode. When cells are stacked the cathode and anode of two adjacent cells must be separated by an electron-conductive layer which is non-permeable for lithium or lithiumions. Usually a metal layer, for instance copper or aluminium, is used for this purpose. A good electron-conductive material is also usually applied at the ends of a cell or stack of cells serving as current collector.

During the charging of a lithium battery electrons may be carried to an anode due to the application of a voltage between cathode and anode. As a result positively charged lithium ions from the cathode material move via the electrolyte material to the anode, where they take up an electron. In this way the battery is charged. During use of the battery the lithium ions move to the cathode, while the electrons move to the cathode via the outside of the cell. In this way the battery is discharged.

When employing the invention at least one of the materials is a powdery material. When using a powdery material for the manufacture of a lithium battery, aspects such as internal resistance and charging time are influenced by the measure in which granules of the powdery material touch each other, and the extent to which granules of two adjacent layers are in contact with each other. In order to enlarge the contact surface between the granules and between the adjacent layers they are hydraulically pressed onto each other using high pressure, in accordance with the prior art. The resulting improvement is not yet satisfactory. With dynamic compaction, that is to say compaction caused by an explosion (see Prümmer, P., Explosivverdichten pulvriger Substanzen, Springer Verlag, Berlijn, 1987) or by impact of a projectile which is, for instance, accelerated by a magnetic field, detonation of an explosive or expansion of a compressed gas (M. A. Meyers, J. C. LaSalvia, D. Hoke and D. K. Kim, "Combustion Synthesis/Densification of ceramics and Ceramic Composites", Proc. $1^{st}$ Int. Conf. Advanced Synthesis of Engineered Materials, 199Z, edited by S. E. Hampson and D. S. Plickert, (ASM International, Ohio, 1993), pp. 43–67), the prevailing pressures are momentarily so high that the contact surface is greatly enlarged not only between the granules but also between the different adjacent material layers. The conditions in the material caused by the explosion or impact may give rise to lattice defects and other defects, augmenting the permeability for lithium ions.

For the fast and economic manufacture of lithium batteries in accordance with the invention, material finely distributed in a carrier is used. The carrier may be liquid or solid. The material may be distributed in a solid substance by mixing the carrier, while it is in solid, liquid or molten condition, with the material and, if necessary, leaving it to cool. If the solid substance is dissolved in a suitable solvent and the solvent is subsequently eliminated thin may, it desired, be carried out by heating and under low-pressure conditions. Once the material is incorporated in a suitable carrier it can be easily handled, which facilitates the manufacture of the battery. The powder to be compacted may also be mixed with a monomer (liquid or solid), which is polymerized previous to or during dynamic compaction.

According to a preferred embodiment the carrier used is a plastic. This facilitates the manufacture of material-containing films. Surprisingly, it appears that the presence of the plastic carrier did not affect the formation of lattice defects and other conductivity-improving defects. Advantageously the plastic is dissolved in a suitable solvent, the solution is mixed with the material and the solvent is removed. This treatment may cause pores to develop in the plastic, which promotes compactability. Plastic films which are not manufactured by using a solvent can also be compacted due to the fact that the packing of polymer chains in plastic is far from optimal.

In order to have lattice defects and other defects develop it is necessary to limit the amount of plastic carrier. This amount depends on the particular plastic carrier and the geometry (shape and size) of the powder particles of the ceramic material. The expert can easily determine the maximum amount of carrier: after dynamic compaction the bulk conductivity of the particular ceramic material should have increased at least 10%, preferably at least 50%. Suitably the plastic should be present in an amount of 5 to 30% by volume related to the entire cathode material, electrolyte material, anode material and plastic. A high plastic content limits the maximum capacity of the lithium battery and the content will preferably be as low as possble. For easy handling with regard to processability it may be necessary to use the somewhat higher contents of plastic.

According to a favourable embodiment PVC, a copolymer of polypropylene and polyethylene, or Solufill (Lrademaik of DSM, Geleen, the Netherlands) is used. These materials have been shown to compact well.

According to a very favourable embodiment the plastic is a lithium-conductive, but non-electron-conductive plastic, such as Nafion (Koksbang, R. et al. ibid.). If the plastic is used for both the cathode and anode, the ability of these layers to conduct electrons or holes is amply ensured by the material in these layer, while the ability to conduct lithium ions is improved. This results in a lower internal resistance and thus a higher power. The decrease of the internal resistance made possible by the use of lithium-conductive plastic also allow the thickness of the cathode and anode layer to be increased without a reduction in the battery's power. The power can of course also be boosted by enlarging the surface of the electrodes.

Another favourable geometry is achieved by winding layers, for instance, around a metal spindle functioning as current collector. In this way batteries can be made of a very great power having an elongated shape without necessarily employing many cells. Fillers, which are used to avoid a high internal resistance in the battery due to insufficient compaction at the ends of the tube, may be omitted. This means a simplification of the manufacture. Therefore, according to a favourable embodiment the method is characterized in that the cathode material, electrolyte material and anode material each are fashioned as a pliable film, and that the cathode material, which is separated from the anode material by the electrolyte material, together with these materials as well as the electron-conductive layer are wound around a spindle, that the coil wound in this manner is inserted into a hollow tube and the tube is dynamically compacted.

During manufacture of the battery it is useful to ensure that one or more layers protrude or are staggered in relation to the other layers; this will avoid short-circuiting and facilitate the attachment of contact points for the supply and discharge of current. This is explained in the FIGURE in which a metal foil 1 is wound around a spindle 2 together with a cathode layer 3 and an electrolyte layer 4. The anode layer 5 and the metal layer 6 which were also wound in, are staggered in relation to the cathode layer 3 and the electrolyte layer 4 in order to avoid that possible deformation during compacting causes, for instance, the anode layer and cathode layer 3 to come into contact with each other. Layer 7 is an insulating layer preventing that metal layer 6 comes into contact with, for instance, metal layer 1. It may also be an advantage to have one or more layers protrude in order to prevent short-circuiting at the ends of the battery or to facilitate connection to the contact points for the supply and discharge of current.

The thickness of the material-containing films or discs depends on the size of the powder particles and on the desired battery geometry and factors such as the extent to Which and velocity with which the lithium ions are capable of moving in the different material layers. An expert in the field of batteries will be able to decide on a suitable choice by means of experiments. The thickness of the electrolyte layer is preferably less than 0.1 mm and most preferably 0.01 mm. Thanks to the invention and in contrast to the known technique of filling with powdery material, it is possible to manufacture lithium batteries having very thin electrolyte layers. The advantage of thin electrolyte layers is that the internal resistance is reduced. This means a higher charging efficiency and a shorter charging time due to a higher charging current.

According to a favourable embodiment of the method according to the invention, a lithium non-permeable electron-conductive material is applied to a cell consisting of cathode material, electrolyte material and anode material to which cell subsequently a further stack of cathode, electrolyte and anode material in applied.

In this way two or more cells are serially connected, producing batteries of a high operating voltage, which can be advantageously applied in electrically powered vehicles and—in miniature—also in consumer and microelectronics.

The invention uses dynamic compaction as a means to manufacture a lithium battery on the basis of powdery materials, which battery, in contrast to batteries having a liquid electrolyte, can be charged fast because they can be charged using a suitably high voltage. If an explosive is used for the fast and economic manufacture of batteries, the explosive is preferably shell-shaped so that it can be pushed over the tube that is to be compacted. This shortens the time necessary for the manufacture of a battery. One might also make use of ail explosion in a closed container, where a very high pressure is developed. The container may, if desired, be cooled metal cylinder having at least one inlet for a fuel/ oxygen mixture or separate inlets for the fuel and oxygen. In addition, the container comprises means such as a spark plug for the ignition of the fuel/oxygen mixture which is introduced into the cylinder, if desired under pressure. The cylinder possesses further a sealable opening for the insertion of a tube that is to be compacted. Such a device is suitable for mass production. It is also possible to use liquid explosives with the device described.

With dynamic compaction care must be taken that adequate compaction has taken place. As long as there is a decrease of internal resistance during a stronger explosion or greater impact, compaction has not been adequately realized. Too forceful a compaction will result in the formation of cracks in the cathode and electrolyte and/or anode material. Decomposition of material present in the tube may cause the development of gasses, so that the stops sealing the tube are unable to withstand the forces during explosive compacting and inferior batteries are obtained.

EXAMPLE

Manufacture of a lithium battery according to the invention.

To manufacture a cathode material-containing plastic film, PVC powder is dissolved in tetrahydrofuran until the solution is homogeneous and transparent. subsequently powdery cathode material, to wit lithium manganese oxide ($Li_{1.1}Mn_2O_4$) having a granule size of about 1 μm, is added at a ratio of 1 part by weight of PVC to 5 parts by weight of lithium manganese oxide and stirred magnetically. Stirring is continued for some time until a homogeneous suspension is obtained. The suspension is poured onto a glass plate and dried by means of compressed air. The thickness of the film thus obtained was 1 mm.

In the same way films were made containing graphite and 7 mole % of lithium-containing boron phosphate ($BPO_4 xLi_2O$, x=0.035) respectively. Their thickness was 0.75 and 1 mm respectively.

From each film discs are cut having a diameter of 28 mm. A cylindrical aluminium tube having an inside diameter of 29.97 mm, a wall thickness of 2.5 mm and a length of 130 mm is at one end provided with a metal stop and a 1 mm thick Teflon inner tube having an inside diameter of 28 mm is inserted into the aluminium tube. For this experiment the tube is not completely filled with cells of the cathode and anode material separated by electrolyte material but is first filled with 40 mm kitchen salt, which is precompacted by tapping and subsequently hydraulically compressed at 200 bar. On top of this a Succession of an aluminium electrode (thickness 0.01 mm), a graphite-containing disc (anode), a boron phosphate and lithium oxide-containing disc (electrolyte), a lithium manganese oxide-containing disc (cathode) and again an aluminium disc (current collector) is placed. The compression is effectuated at 200 bar. In the same way three more cells are inserted after which the remaining space is filled with kitchen salt, as described above. The tube is then sealed by means of an aluminium plug which is pressed in at 200–250 bar.

The aluminium tube is inserted vertically into a vertically placed cylindrical PVC container (17 cm long, inside diameter 70 mm). The container is filled with explosive (660 g Wetter Energit B, detonation velocity 1,65 km/s), provided with a PVC lid having in its middle a detonator.

The detonation produces an explosion with a vertically downward force. Due to the gasses released during the explosion the aluminium tube is substantially compacted radially.

After the explosion the length of the tube is decreased by 6 mm, the inside diameter by 3.5 mm. The electronic resistance of the battery is several megohms, which shows that there is no sign of short-circuiting in any of the four cells.

Examination of a metal-containing graphite layer by EDX (Energy Dispersive X-ray microanalysis) showed that in radial direction the concentration of chlorine atoms does not vary, which suggests that the carrier does not even partly decompose during explosive compacting.

The expert understands that within the scope of the invention there are many ways to apply the method.

For instance, the carrier could be a liquid, in which the cathode material, electrolyte material or anode material are finely distributed. The carrier, containing the finely distributed material may be sprayed onto a substrate to form a thin layer, which substrate comprises, for instance, a current collector or other layer of material. The carrier may also contain a binder which, after evaporation of the liquid, keeps the fine material together. The substrate onto which the thin layer is deposited can, it desired, be heated. Alternatively, it is also possible to use a liquid which congeals or solidifies upon contact with the substrate, in which case the liquid should not contain any water and may or may not remain fluid for a short time. As a result of electrolysis, any water in the battery may decompose during use and destroy the battery.

When employing a solid or liquid carrier, it may be desirable to remove said carrier by means of, for instance, heat treatment, after the assembly of one or more cells and before the stacked material in explosively compacted.

When employing a material-containing film, the film may be provided with surface-enlarging structures such as corrugations, whereby the material layers are stacked such that their corrugations fit into the corrugations of other material layers.

What is claimed is:

1. A method for the manufacture of a lithium battery, the method comprising the steps of:
   a) introducing a powder into a carrier to form a material comprising the carrier and the powder;
   b) contacting the material with at least one additional material to form an assembly of materials, the assembly of materials comprising cathode material, electrolyte material and anode material, wherein the electrolyte material comprises a lithium ion-conductive and non-electron-conductive material for separating the cathode material from the anode material, and wherein at least the cathode material comprises a ceramic and wherein lithium is contained within at least one member selected from the group consisting of the cathode material and the anode material; and
   c) performing dynamic compaction of the assembly of materials.

2. The method according to claim 1, comprising introducing the materials of the assembly of materials into a hollow tube before the dynamic compaction step.

3. The method according to claim 1, characterized in that at least one of the materials comprising the assembly of materials results from the additional step of processing the carrier containing powder into a solid film before the contacting step and the dynamic compaction step.

4. The method according to claim 3, characterized in that the film comprises an electrolyte material-containing film comprising a thickness of less than approximately 0.1 mm.

5. The method according to claim 4, characterized in that the film comprises a thickness of less than approximately 0.01 mm.

6. The method according to claim 3, characterized in that the carrier comprises a plastic.

7. The method according to claim 6, characterized in that the plastic comprises a member selected from the group consisting of PVC, a copolymer of polypropylene and polyethylene and ultra-high molecular weight polyethylene.

8. The method according to claim 6, characterized in that the plastic comprises a lithium ion-conductive plastic.

9. The method according to claim 6, characterized in that the plastic comprises from approximately 5% to approximately 30% by volume in relation to total volume of the assembly of materials.

10. The method according to claim 1, comprising applying a lithium and lithium ion non-permeable electron-conductive material to a battery cell comprising cathode material, electrolyte material, and anode material and subsequently applying onto the battery cell a further stack of cathode, electrolyte, and anode material to form a larger battery.

11. The method according claim 1, comprising fashioning each of the cathode material, the electrolyte material, and the anode material as a pliable film, and winding the cathode material, the anode material and the electrolyte material, together with an electron-conductive layer and an insulating layer, around a spindle and inserting the materials wound in this manner into a hollow tube and performing dynamic compaction of the tube.

\* \* \* \* \*